Figure 3:
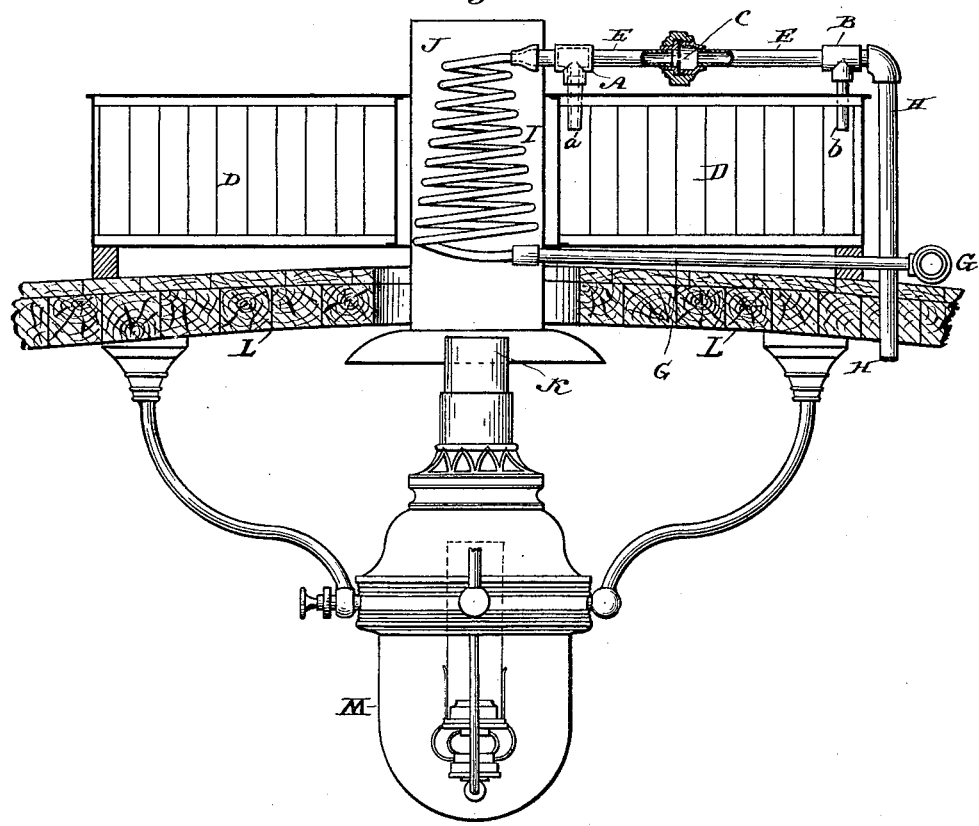

(No Model.) 2 Sheets—Sheet 1.
C. B. DUDLEY.
CARBURETOR FOR AIR OR GAS.
No. 368,137. Patented Aug. 9, 1887.
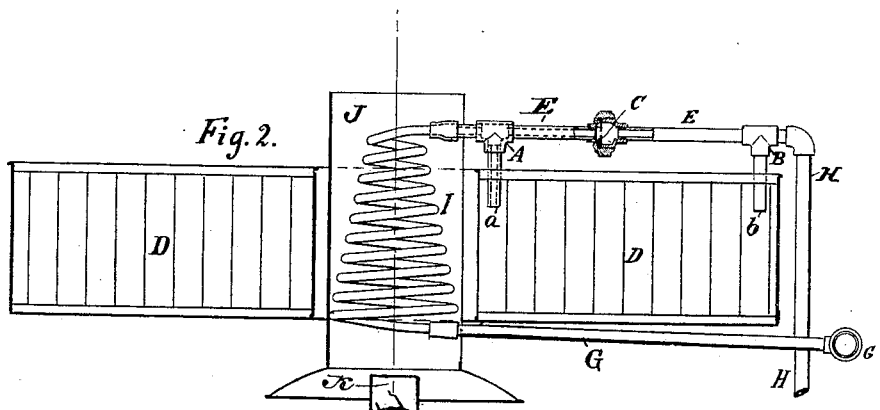
WITNESSES:
INVENTOR
Charles B. Dudley
BY Francis T. Chambers
his ATTORNEY (No Model.)  2 Sheets—Sheet 2.

C. B. DUDLEY.
CARBURETOR FOR AIR OR GAS.

No. 368,137.  Patented Aug. 9, 1887.

Witnesses
H. W. Elmore
Geo. D. Mitchell

Inventor
CHARLES B. DUDLEY.

By his Attorney
Francis T. Chambers

UNITED STATES PATENT OFFICE.

CHARLES B. DUDLEY, OF ALTOONA, PENNSYLVANIA.

CARBURETOR FOR AIR OR GAS.

SPECIFICATION forming part of Letters Patent No. 368,137, dated August 9, 1887.

Application filed May 22, 1886. Serial No. 203,001. (No model.)

*To all whom it may concern:*

Be it known that I, CHARLES B. DUDLEY, of Altoona, county of Blair, State of Pennsylvania, have invented a new and useful Improvement in Carburetors for Air or Gas, of which the following is a true and exact description, due reference being had to the accompanying drawings, which form a part of this specification.

My invention relates to the carbureting of air or combustible gas for use as an illuminant. This, as is well known, is done by passing the air or gas through a carburetor containing gasoline or a solid or liquid volatile hydrocarbon, and one of the difficulties incurred in the use of such devices, especially where the carburetor is warm, is due to the fact that the amount of volatile hydrocarbon taken up is frequently so great as to produce too rich a gas, which gives trouble, first, by condensing in the pipes, and, secondly, by making a smoky flame. A great many plans have been suggested for overcoming this difficulty, and among them the device of diluting the vapor-laden air or gas issuing from the carburetor with a fresh quantity of the uncarbureted carrier-gas. This plan as heretofore carried out, however, has not proved altogether successful—first, on account of the difficulty in adjusting the relative proportions of carbureted and uncarbureted gas to be mixed together, and, second, on account of the lowering of the temperature caused by mixing a cold or comparatively cold gas with the vapor-ladened gas coming from the carburetor, the loss of heat being often as effective in causing condensation in the pipes as the increased quantity of carrier gas in preventing it.

The object of my invention is to provide means for regulating the proportions of carbureted and uncarbureted gas to be mixed together and for heating the uncarbureted gas before it is added to the gas coming from the carburetor, and especially to improve and perfect the carbureting device heretofore invented by me, and which is shown and described in my Patent No. 342,863.

Reference is now had to the drawings, which illustrate my invention applied to a carburetor such as is described in my said former application, and in which—

Figure 1 is a plan view of said carburetor with a part of the top removed; Fig. 2, a central sectional elevation of the carburetor with a portion of my connecting-pipe also shown in section; and Fig. 3 represents a like view of the carburetor, and illustrates it, further, as mounted upon the roof of a railway-car and heated by the car-lamp. Fig. 4 is an enlarged detail sectional view of the part of the connecting-pipe shown in section in Figs. 2 and 3.

D is a carburetor, adapted to be placed upon a suitable support—as, for instance, the roof of a railway-car, a portion of said roof being represented in the drawings at L.

J is a flue or chimney through which the hot products of combustion are led from the chimney K of a lamp or the like, as shown at M.

I is a heating device, here shown as a coil of pipe, which I have found a convenient heater. The coil is connected at one end with the supply-pipe and situated in the heated flue J.

A is a three-way-pipe branch connection with which the coil I connects, and which is connected also with the pipe $a$, which opens into the carburetor, and with a pipe, E.

B is a pipe-branch connection similar to A, and is connected with the pipe $b$, which opens out of the carburetor, the pipe H, which leads the carbureted gases to the burners, and the pipe E, which thus connects the branches A and B.

C is a diaphragm or thin metal plate firmly secured in the pipe E and provided with an orifice, $c$, of known area.

The carburetor D is preferably inclosed in a casing like that shown in my aforesaid patent, and, as shown, is intended to be placed upon the top of a railway-car and immediately above the burner in the car.

The air or gas coming from the air-brake system or other source of supply is conducted by the pipe G to the heating-coil I, situated in the heated flue J, where it is heated, and after passing through said coil it reaches the branch connection A, one portion of the air or gas passing into the carburetor through the pipe $a$, and, after going through the carburetor, issuing from it through the pipe $b$ into the branch connection B. Another portion of the heated air or gas passes directly from A to B through the pipe E, and at B meets and mixes with the carbureted gas issuing from the carburetor, the mixed gases passing together through the pipe H to the burner. At some convenient place in the pipe E, I place the perforated diaphragm C, which is a thin metal plate within an orifice, c, of known area. The size of this orifice is such as will allow a certain determined proportion of the air or gas to pass through it, while the remainder passes through the carburetor; and the resistance which the gas experiences in passing through the carburetor having been ascertained in terms of the height of a column of water, it is very easy to determine the size of the aperture which, in accordance with the law governing the flow of gases through apertures in thin plates, will allow a predetermined percentage of air or gas to flow through the pipe E. The gas passing through the pipe E is of course, when it reaches the connecting-joint B, as hot, and indeed hotter, than the carbureted gases issuing through the pipe b, and hence there is no lowering of the temperature of the carbureted gas or tendency to condense the hydrocarbon vapor.

While I prefer to use the perforated diaphragm C, its place may, in many instances, be supplied satisfactorily by a cock or valve, or such device may be used in connection with it. The heating-coil I may also be modified in form, any device which will cause the air or gas to be exposed to the heated gases in the flue J being its manifest equivalent. Obviously, also, the heating or warming of the air or gas may be effected in some other way; and while I prefer the arrangement shown, I do not intend in this application to limit myself exclusively to carburetors and heating devices such as shown and described, or to carburetors in which the air or gas is heated before passing through the carburetor, for if the portion of the carrier-gas which mixes with the carbureted gases is alone heated, or is heated to a higher degree than the gas which issues from the carburetor, the main object of my invention, which is to dilute the carbureted gas with uncarbureted gas of a temperature as high and preferably higher than the carbureted gas, will be carried out. In all cases, however, it is important that the heating device should be situated close to the carburetor, so that no loss of heat shall occur by reason of having to transport the hot gas to a considerable distance.

Having now described my invention, what I claim as new, and desire to secure by Letters Patent, is—

1. The combination, with a carburetor, of an inlet-pipe for air or gas, a heating device for said inlet-pipe, an exit-pipe leading from the carburetor, and a by-pass pipe connecting the said inlet and exit pipes, whereby the carbureted air or gas on its exit from the carburetor is diluted with hot uncarbureted air or gas, substantially as described.

2. The combination, with a carburetor, of an inlet-pipe for air or gas, said inlet-pipe being provided with a coil, a heating-flue within which said coil is located, an exit-pipe leading from the carburetor, and a by-pass pipe exterior to the carburetor and connecting the inlet and exit pipes thereto, substantially as described.

3. The combination, with a carburetor, of an inlet-pipe for air or gas, a heating device for said inlet-pipe, an exit-pipe leading from the carburetor, and a by-pass pipe connecting said inlet and exit pipes, said by-pass pipe being provided with a perforated diaphragm, C, substantially as described.

CHAS. B. DUDLEY.

Witnesses:
FREDERICK N. PEASE,
E. C. STOCKTON.